April 1, 1969

A. J. SARKA 3,435,737

METHOD AND APPARATUS FOR REMOVING WASTE
PIECES FROM SHEET MATERIAL

Filed June 16, 1967

INVENTOR.
ALBERT J. SARKA

BY
*Yount, Raney, Flynn and Tarolli*
ATTORNEYS

INVENTOR.
ALBERT J. SARKA
BY
ATTORNEYS

United States Patent Office 3,435,737
Patented Apr. 1, 1969

3,435,737
METHOD AND APPARATUS FOR REMOVING WASTE PIECES FROM SHEET MATERIAL
Albert J. Sarka, Fairview Park, Ohio, assignor to Harris-Intertype Corporation, Cleveland, Ohio, a corporation of Delaware
Filed June 16, 1967, Ser. No. 646,611
Int. Cl. B31b 1/74; G03b 1/24
U.S. Cl. 93—36        16 Claims

ABSTRACT OF THE DISCLOSURE

A pair of cooperable rotating cylinders define a stripping nip therebetween through which sheet material, which has been cut into waste pieces and articles, is fed. A plurality of barbed stripping pins are carried by one of the cylinders and each impales a waste piece and moves the same away from the articles to effect separation of the waste pieces from the articles. The separated waste piece is then pushed onto a tapered section of the pin to enlarge the pierced hole in the piece to a size greater than the transverse dimension of the barb to enable the waste piece to be readily removed from the pin.

---

The present invention relates to a method and apparatus for removing waste pieces from sheet material which has been cut into articles and waste pieces, and in particular relates to a stripper apparatus having a rotatable manner which carries a plurality of barbed impaling pins for impaling the waste pieces of the sheet material and for effecting movement of the same away from the articles to cause separation of the waste pieces from the articles as the member or drum is rotated.

An important object of the present invention is the provision of a new and improved method and apparatus for stripping a waste piece from sheet material and wherein a stripper pin carried on a movable member impales the waste piece and carries the waste piece away from the sheet material, and the waste piece is then removed from the stripper pin in an extremely simple and efficient manner.

A further object of the present invention is the provision of a new and improved method and apparatus for separating a waste piece from sheet material and in which a stripper pin pierces a hole in the waste piece and which hole is enlarged such that the transverse dimension of the enlarged hole is greater than the transverse dimension of the end of the stripper pin so as to enable the waste piece to be readily and easily removed from the stripper pin.

Still a further object of the present invention is the provision of a new and improved method and apparatus for separating a waste piece from sheet material and in which the waste piece is impaled by a barbed stripper pin and then moved away from the sheet material, and the pierced hole in the waste piece is then enlarged by pushing the waste piece along a tapered portion of the stripper pin so as to enable the waste piece to be readily and easily removed from the stripper pin.

Another object of the present invention is the provision of a new and improved method and apparatus, as defined in the next preceding paragraph, and in which the waste piece after the pierced hole therein has been enlarged is subjected to an outwardly directed force to effect removal of the waste piece from the stripper pin.

The present invention further resides in certain novel constructions and arrangements of parts and other objects, advantages, and novel characteristics thereof will be apparent from the following detailed description of a preferred embodiment of the present invention made with reference to the accompanying drawings forming a part of the present specification and in which similar reference numerals are employed to designate corresponding parts throughout the several views, and in which.

Figure 1:
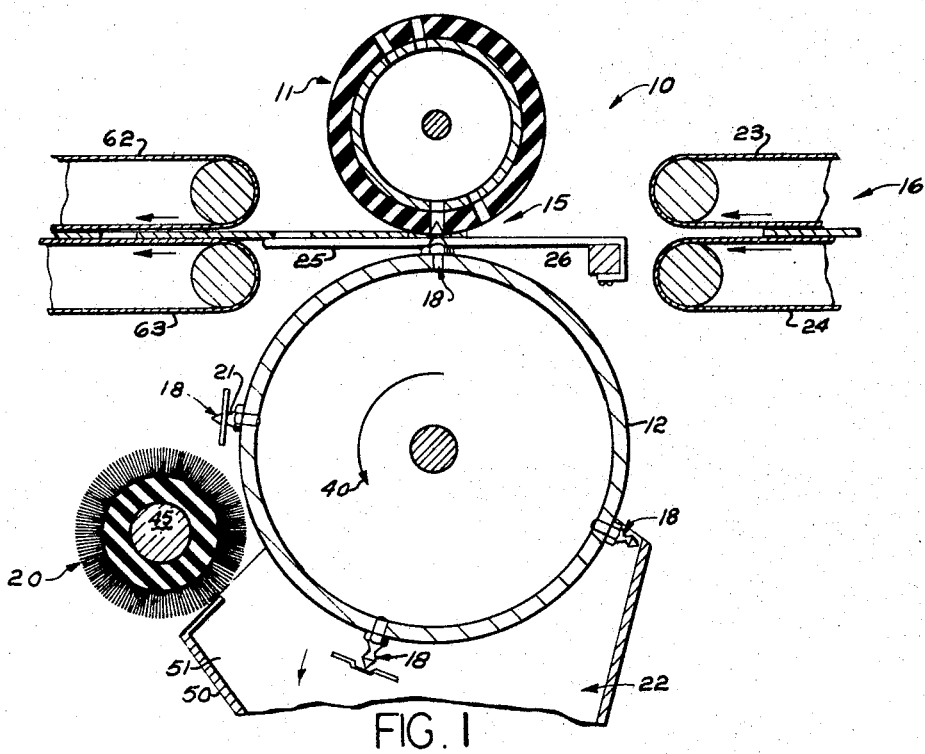
FIG. 1 is a fragmentary schematic cross-sectional view of a stripping apparatus embodying the present invention.

The present invention provides a novel method and apparatus for stripping or separating waste pieces from sheet material which has been cut into articles and waste pieces. Although the method and apparatus of the present invention are capable of stripping waste pieces from various types of articles cut from sheets or webs, it is particularly useful for separating waste pieces or broke from carton or box blanks, and for the purposes of illustration is herein shown and described as being used for that purpose.

The novel method for stripping or separating waste pieces from sheets which have been cut into box blanks and waste pieces includes the steps of impaling each waste piece with a barbed stripper pin to secure the waste piece thereto. The pin and waste piece thereon then move away from the box blanks to thereby separate the waste piece and box blanks. The pierced hole, formed in the waste piece as the result of the impaling operation, is enlarged while the waste piece is on the pin to enable the waste piece to be easily and readily removed from the pin. Although gravity and/or centrifugal force acting on the waste piece may in some instances be sufficient to effect release of the waste piece from the pin after the pierced hole has been enlarged, the preferred method includes the step of applying an additional outwardly directed force to the waste piece to ensure its removal from the pin.

A stripping apparatus embodying the present invention is shown in FIGS. 1–6 and is designated generally by the reference numeral 10. The stripping apparatus 10 comprises, in general, a pair of oppositely rotating cylinders or rolls 11, 12 defining a stripping nip 15 therebetween through which the sheets are adapted to be advanced. A feeding means 16 advances the sheets through the nip 15. As the sheets move through the nip 15, a plurality of barbed stripper pins 18 carried by the cylinder 12 impale the waste pieces in the sheets and move the impaled waste pieces away from the direction of movement of the sheets to cause the waste pieces to be separated therefrom. A roller means 20 pushes the waste pieces removed from the sheets toward the periphery of the cylinder 12 along a tapered portion 35 of the pins to effect an enlargement of the pierced hole to enable the waste pieces to be readily removed from the pins, and suction means 22 assists in the removal of the waste pieces from the pins 18.

The feeding means 16, as shown, comprises a pair of cooperating feed belts 23, 24 movable in an endless path and which receive the sheets therebetween from a cutting and creasing apparatus (not shown) which previously cut the sheets into carton blanks and waste pieces. The sheets are advanced by the feed belts 23, 24 through the nip 15 and are supported while passing through the nip by a plurality of spaced support fingers or bars 25. The support fingers are secured at one end to a support bar 26 which in turn is suitably supported at its opposite ends by a pair of spaced side frames (not shown). The fingers 25 are spaced such that the waste pieces to be separated from the sheets can pass therebetween.

Figure 2:
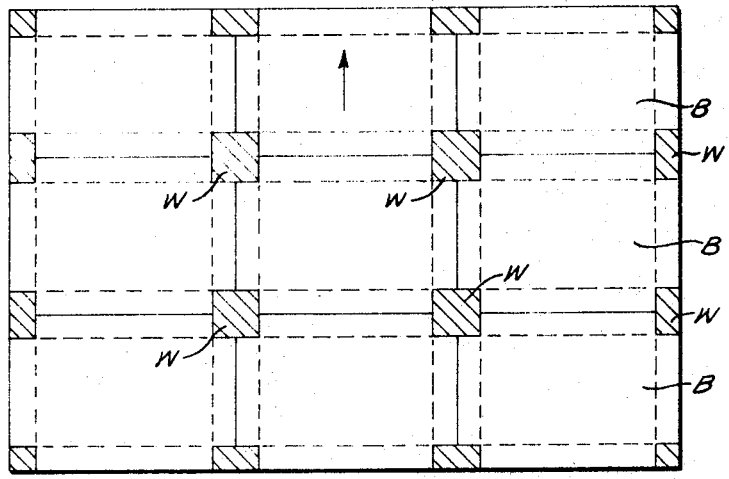
FIG. 2 is a fragmentary top plan view of a sheet cut into articles and waste pieces.
Figure 3:
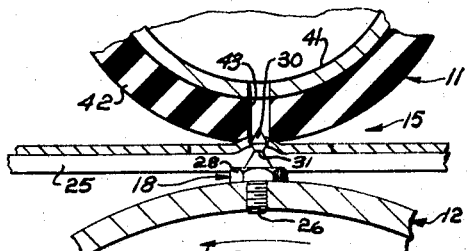
FIGS. 3–6 are enlarged fragmentary sectional views of part of the apparatus shown in FIG. 1 showing certain parts thereof in different relative positions.
Figure 4:
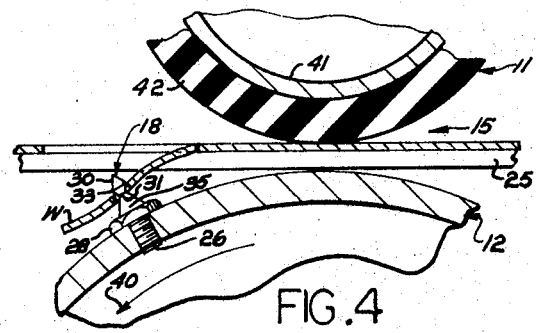
Figure 5:
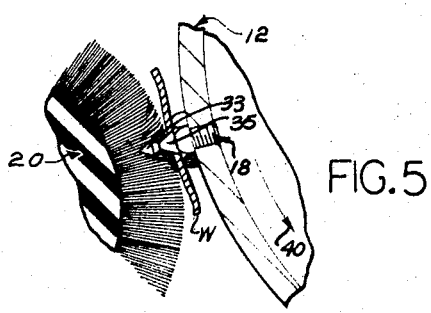
Figure 6:
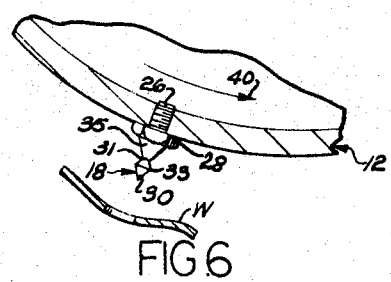

As the sheet is being advanced through the nip 15, the waste pieces are separated from the cut carton blanks by the barbed stripper pins 18 carried by the rotating cylinder or drum 12. The barbed stripper pins 18 are located at spaced axial and circumferential locations on the cylinder 12, the number of stripper pins provided and their relative positions on the drum 12 being dependent on the number of and location of the waste pieces to be removed from the sheets. For example, FIG. 2 shows a sheet which has been cut into carton blanks B and waste pieces W. The cut lines are indicated by the solid lines, fold or score lines are indicated by the dotted lines, and the waste pieces W between the adjacent cartons are indicated by the cross-hatched portions. The number of stripper pins 18 and their relative locations on the drum 12, in the illustrated embodiment, correspond to the locations and number of waste pieces W. It should also be understood that pins 18 could also be employed for removing any external waste, i.e., the border or frame surrounding the entire part of a sheet, provided that these portions are cut to enable the same to be pulled downwardly between the space support fingers 25.

As best shown in FIGS. 3–6, the stripper pins 18 are of a one-piece construction and are threadably connected at their inner ends 26 to the drum 12. The pins are provided with an integrally formed nut portion 28 which seats against the periphery of the drum 12 when drawn into engagement therewith. The stripper pins 18 at their outer end have a conical head 30 and a necked down portion 31 located inwardly of the base of the conical head to provide a barb 33. The pins 18 also include an axially tapered portion 35 intermediate the neck portion 31 and the nut portion 28 to provide for enlargement of the pierced hole in the waste pieces, and for reasons to be hereinafter more fully described. The tapered shank portion 35 has a diameter which progressively increases from the inner end of the neck portion 31 toward the nut portion 28, and the maximum diameter of the tapered shank portion is substantially greater than the diameter of the barb 33.

As the respective stripper pins 18 approach the stripping nip 15 in response to rotation of the drum 12 in a direction of the arrow 40, the impaling pin 18 projects between the spaced finger supports 25. Each pin 18 engages and pierces a waste piece of the sheet. As the impaling pin 18 engages the waste piece, it pushes the sheet up against the peripheral surface of the cylinder 11, the latter rotating at the same surface speed as the cylinder 12 and the moving sheet and serving as a backing roll to prevent upward movement of the sheet to enable the pin 18 to pierce a hole in the waste piece. The roll 11, since it prevents upward movement of the sheet, in effect, pushes the sheet onto and over the barb 33 of the impaling pin 18 to secure the waste piece thereto. The roll 11 is shown in FIG. 1 of the drawings as being a half size roll having a hollow metal cylindrical sheell 41 and an annular cover 42 made of rubber or the like. The roll 11 is provided with radial holes 43 extending through the rubber cover 42 and the inner metal shell 41 at the locations where the pins 18 would otherwise engage the roller 11. The provision of the holes 43 in the roll 11 enables any tiny pieces of carton material often pushed out by the stripper pins 18 to be pushed through the holes 43 to the inside of the shell 41. Otherwise, these pieces would be embedded in or impacted on the resilient peripheral surface of the rubber cover 42 to subsequently cause a bulging thereof which in turn could effect breakage of the pins 18.

As the drum 12 continues to rotate in the direction of the arrow 40, the barbed pin 18 effects movement of the waste piece away from the direction of movement of the sheet, which moves generally tangential of the drum 12. This results in the waste piece being separated or stripped from the sheet. The sheet continues to move in a path tangential to the drum due to the support provided by the support fingers 25.

The separated waste piece carried by the stripper pin 18 is pushed inwardly toward the periphery of the drum 12 and along the tapered portion 35 of the pin 18. This results in an enlargement of the diameter of the pierced hole. The extent of movement of the waste piece onto the tapered portion 35 is sufficient to effect enlargement of the pierced hole to a diameter greater than the diameter of the bar 33. Any suitable means may be utilized to effect movement of the waste piece onto the tapered portion 35 of the pin 18. In the present embodiment, the roller means 20, which performs this function, comprises a brush roller made of closely packed, fairly stiff wire bristles and is rotatably supported by a support shaft 45 carried by the spaced side frames (not shown). The bristles of the roller 20 are effective to push the waste piece along the tapered portion 35 of the pin 18 as it is moved past the roller 20.

After the pierced hole in the waste piece has been enlarged by pushing it along the tapered portion 35 of the pin 18, the waste piece can be readily and easily extracted or removed from the pin 18. In some instances, gravity and/or centrifugal forces acting on the waste piece may be sufficient to overcome the frictional force holding the waste piece on the tapered portion of the pin so as to effect removal of the same from the pin 18. However, to ensure that removal of the waste piece from the pin occurs, the illustrated embodiment shown in FIG. 1 includes a suction means 22 to apply an outwardly directed force on the waste pieces in addition to the gravity and centrifugal forces acting thereon. The suction means 22 comprises a housing 50 defining a vacuum chamber 51 in communication with and surrounding the periphery of the drum along the bottom portion of its travel. Suitable clearance space is provided between the housing 50 and the periphery of the drum 12 and to enable the pins 18 to move through the vacuum chamber 51 as the drum 12 is rotated. The vacuum chamber 51 is connected to a suitable vacuum source to create a suction on the waste pieces to draw them downwardly from the pin and into the chamber 51. The waste pieces are preferably removed by a conventional vacuum waste removal system and are deposited in a location remote from the machine.

Figure 7:
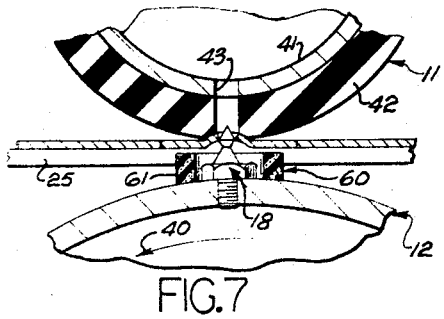
FIGS. 7–9 are fragmentary schematic sectional views illustrating another embodiment of the present invention and showing parts thereof in different relative positions.
Figure 8:
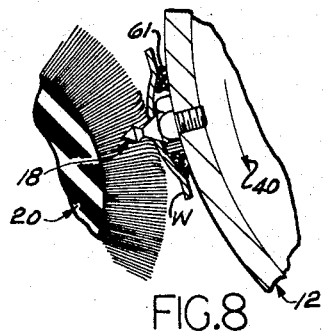
Figure 9:
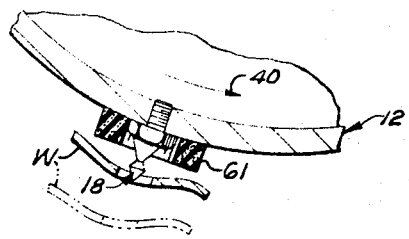

FIGS. 7–9 show a mechanical means 60 associated with each pin for ejecting the waste piece outwardly of the drum 11 to effect removal thereof from the pin 18 after the diameter of the pierced hole has been enlarged. The mechanical means 60 may be employed in place of or in conjunction with the suction concept illustrated in FIG. 1 of the drawings. The mechanical means 60 comprises an annular resilient collar 61 mounted on the periphery of the drum 12 and in surrounding relationship with each of the pins 18. As shown in FIG. 8, the resilient collar 61 is compressed when the waste piece is pushed onto and along the tapered portion 35 of the pin to enlarge the pierced hole thereof by the brush roller 20. The elastic forces tending to return the collar 61 to its normal position, as shown in FIG. 9, causes the waste piece to be ejected outwardly off the pin 18. The resilient collar 61 could be made from any suitable rubber material which is highly resilient and which will effect a snap-back action sufficient to cause the waste piece to be ejected outwardly and off the pin. Alternately, a suitable spring could be employed in place of the resilient collar 61.

Figure 10:
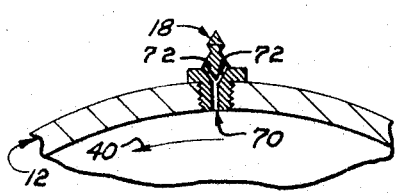
FIG. 10 is a fragmentary sectional view of another embodiment of the present invention.

FIG. 10 shows a pneumatic means 70 associated with each pin for ejecting the waste piece from the pin after the diameter of the pierced hole has been enlarged. The pneumatic means 70 comprises passages or nozzles 72 through the pin 18 and through which compressed air is adapted to be forced. The air jets emitting through the passages 72 impinge upon the waste piece to apply an outwardly directed force thereto to effect removal of the same from the pin 18. Air under pressure can be supplied through the hollow cylinder 12 from any suitable source, and in a manner well known to those skilled in the art.

It will, of course, be understood that the pneumatic ejecting means 70 for ejecting the waste pieces from the pins 18 could be employed in conjunction with the suction means shown in FIG. 1. Alternately, a mechanical combing means or brush may be employed for removing the waste pieces from the pins.

The sheets after the waste pieces have been removed therefrom are adapted to be fed by a pair of moving, cooperating delivery belts 62, 63 to a suitable stacking conveyor or pile. The cylinders 11, 12 are adapted to be fixed to shafts which are rotatably supported by the side frames (not shown) and are adapted to be rotated in a direction of the arrows shown in FIG. 1 by any suitable or conventional drive means which rotates the cylinders at the same peripheral surface speeds.

From the foregoing, it should be apparent that a novel method and apparatus have been provided which are simple, economical and highly efficient, and wherein stripper pins strip waste pieces from sheet material and the waste pieces are then removed from the stripper pins. It should be apparent that by enlarging the diameter of the pierced hole after the waste piece has been stripped from the sheet material that the waste pieces can be readily and easily removed from the stripper pins. Also it should be noted that the various means for effecting removal of the waste pieces from the pins do not have to be especially adjusted in accordance with the locations of the stripper pins on the cylinders, such as is required with combers. This enables the make ready time to be shortened because the pins can be located anywhere on the drum without necessitating any corresponding adjustments in the means for removing the waste material.

From the foregoing, it should be apparent that the hereinbefore enumerated objects and others have been accomplished and that a new and improved method and apparatus for stripping waste material from sheets have been provided.

Having described my invention, I claim:

1. A method for stripping a waste piece from sheet material which has been cut into articles and waste pieces comprising the steps of impaling the waste piece with a barbed pin to secure the waste piece thereto, moving the pin and waste piece thereon away from said articles to separate the waste piece therefrom, and thereafter enlarging the hole formed in said waste piece as a result of the impaling operation to a size larger than the barb while said waste piece is still on said pin to enable the waste piece to be readily removed therefrom.

2. A method as defined in claim 1 and wherein the step of enlarging the hole in the waste piece comprises the step of pushing the waste piece along a tapered portion of the pin to enlarge the hole therein.

3. A method as defined in claim 1 and including the step of moving said pin to a waste release location wherein the pin projects downwardly after enlarging said hole to enable said piece to be removed from said pin at least in part by gravity.

4. A method as defined in claim 1 and including the step of applying an outwardly directed force to said waste piece after the hole therein has been enlarged to at least in part aid in the removal of the waste piece from the pin.

5. A method as defined in claim 4 and wherein said outwardly directed force is applied by creating a suction force on said waste piece.

6. A method as defined in claim 4 and wherein said outwardly directed force is applied on the side of the waste piece remote from the barb.

7. A method for stripping a waste piece from sheet material which has been cut into articles and waste pieces comprising the steps of moving a barbed pin in an arcuate path, moving the sheet material tangentially of the path of movement of the pin in the same direction and at substantially the same surface speed, forcing a waste piece onto said pin to pierce said waste piece and to anchor the same behind the barb of the pin when the pin is disposed in the path of movement of said sheet material during its movement through said arcuate path, continuing movement of the pin in the arcuate path to effect separation of the waste piece from the sheet material, and thereafter enlarging the pierced hole formed in the waste piece to a size larger than the barb while the waste piece is still on the pin to enable the waste piece to be readily removed from the pin.

8. A method as defined in claim 7 and including the step of applying an outwardly directed force to the waste piece after the hole has been enlarged therein to at least assist in removal of the waste piece from the pin.

9. A method as defined in claim 7 and wherein the step of enlarging the hole in the waste piece comprises the step of pushing the waste piece along a tapered portion of the pin to enlarge the hole therein.

10. A stripping apparatus for stripping waste pieces from sheet material which has been cut into articles and waste pieces comprising a pair of cooperable members defining a stripping nip therebetween through which the sheet material passes, one of said members being rotatable and carrying barbed stripper pins for impaling said waste pieces and for moving said waste pieces away from the direction of movement of the articles as said one member is rotated to effect separation of the waste pieces from the articles, the other of said members providing a backing against which the sheet material is pressed and which enables each pin to pierce a waste piece to a depth to anchor the same behind the barb, and means remote from said stripping nip for pushing said separated waste piece onto an axially tapered portion of said pin to effect enlargement of the pierced hole in the waste piece to a size such that its transverse dimension is greater than the transverse dimension of the barb on the pin so as to enable the waste piece to be readily removed from the pin.

11. A stripping apparatus as defined in claim 10 wherein said means for pushing the waste piece along the tapered section of the pin comprises a rotary brush having bristles which are located in the path of movement of the pin and waste piece.

12. A stripping apparatus as defined in claim 10 further including ejecting means for applying an outwardly directed force to the waste piece to effect removal of the waste piece from the pin after the pierced hole therein has been enlarged, said ejecting means comprising a resilient member carried by said one member, said resilient member having a normal position when free of any externally imposed forces in which its outer end is disposed outwardly of the axially tapered portion and which is compressible upon said waste piece being pushed along the tapered portion, said resilient member effecting movement of the waste piece outwardly from the pin when the compressive forces imposed thereon are released.

13. A stripping apparatus as defined in claim 10 and including means for applying a vacuum pressure to said waste piece after the hole therein has been enlarged to at least assist in removal of the waste piece from the pin.

14. A stripping apparatus as defined in claim 10 and wherein said stripped pins have a fluid passage therethrough, and including means for supplying air under pressure to said passage to effect an air jet which impinges on the waste piece to effect removal of the same from the pin.

15. A stripping apparatus for stripping waste pieces from sheet material which has been cut into articles and waste pieces comprising a movable member, a barbed pin movable with said member and operable to impale the waste piece to secure the waste piece thereto and effect movement of the waste piece away from said articles, and means for enlarging the hole formed in said waste piece as a result of the impaling operation to a size larger than the barb on said pin while said waste piece is on said pin to enable the waste piece to be readily removed therefrom.

16. An apparatus as defined in claim 15 wherein said means for enlarging said hole comprises a tapered portion of said pin and means for forcing said waste piece along said pin onto said tapered portion.

References Cited

UNITED STATES PATENTS

| 2,888,860 | 6/1959 | Baumgartner | 93—36 |
| 3,320,864 | 5/1967 | Zernov | 93—36 |

ALLEN N. KNOWLES, *Primary Examiner.*

R. A. SCHACHER, *Assistant Examiner.*

U.S. Cl. X.R.

226—5, 80